(12) United States Patent
Wirtz et al.

(10) Patent No.: US 6,279,224 B1
(45) Date of Patent: *Aug. 28, 2001

(54) BATTERY ASSEMBLY DUAL WORKSTATION

(75) Inventors: John O. Wirtz, Fort Gratiot, MI (US); Stephanus Petrus Janse van Vuuren, Atlanta, GA (US)

(73) Assignee: Leko U.S.A., Inc., Port Huron, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,810

(22) Filed: Apr. 23, 1999

(51) Int. Cl.$^7$ .............................. B23P 19/00; B23P 21/00
(52) U.S. Cl. ................................ 29/711; 29/730; 29/783; 29/791; 29/822
(58) Field of Search .............................. 29/711, 730, 783, 29/791, 822, 786, 794, 33 P; 198/346.1

(56) References Cited

U.S. PATENT DOCUMENTS

| | | | | |
|---|---|---|---|---|
| 3,810,554 | * | 5/1974 | London et al. | 198/30 |
| 3,848,746 | * | 11/1974 | Van Der Winden | 198/31 |
| 3,908,743 | * | 9/1975 | Schenk, Jr. et al. | 164/80 |
| 3,955,678 | * | 5/1976 | Moyer | 207/74 |
| 4,013,864 | * | 3/1977 | Tiegel et al. | 29/730 |
| 4,440,289 | * | 4/1984 | Weis | 198/448 |
| 4,509,252 | * | 4/1985 | Sabatino et al. | 29/730 |
| 4,525,923 | * | 7/1985 | Alvarez | 29/730 |
| 4,596,625 | * | 6/1986 | Alvarez | 29/730 |
| 4,887,350 | * | 12/1989 | Hopwood | 29/730 |
| 4,984,351 | * | 1/1991 | Matsuyama et al. | 29/33 P |
| 5,048,665 | * | 9/1991 | Vickers | 198/350 |
| 5,205,026 | * | 4/1993 | Sticht | 29/33 P |
| 5,234,473 | * | 8/1993 | Piper et al. | 29/730 |
| 5,440,601 | * | 8/1995 | Kuhfuss | 377/8 |
| 5,539,975 | * | 7/1996 | Kukuljan et al. | 29/711 |
| 5,602,328 | * | 2/1997 | Palmer | 73/49.3 |
| 5,606,114 | * | 2/1997 | Palmer | 73/49.3 |
| 5,900,030 | * | 5/1999 | Farmer et al. | 29/730 |
| 5,979,635 | * | 11/1999 | Calhoun | 198/456 |
| 6,036,075 | * | 3/2000 | Aebersold et al. | 29/711 |

* cited by examiner

Primary Examiner—Tom Hughes
Assistant Examiner—Marc Jimenez
(74) Attorney, Agent, or Firm—Reising, Ethington, Barnes, Kisselle, Learman & McCulloch, P.C.

(57) ABSTRACT

An apparatus having at least two separate workstations to which workpieces are alternately advanced to provide at substantially all times, in at least one workstation, a workpiece ready to be worked on by a tool carried by a shuttle which transfers the tool between the workstations. Desirably, after working on a workpiece in a first workstation, the shuttle carries the tool to a second workstation to work on a workpiece waiting in the second workstation. Simultaneously, the workpiece in the first workstation, that was just worked on by the tool, is moved downstream away from the tool and a subsequent workpiece is advanced into the first workstation so that it is ready to be worked on by the tool when the tool returns to the first workstation. Thus, the tool does not have to wait for a new workpiece to be advanced into position after performing work on a workpiece. Desirably, this dramatically increases the productivity of the apparatus or machine without substantially increasing the cost of the apparatus or machine as a whole.

14 Claims, 5 Drawing Sheets

BATTERY ASSEMBLY DUAL WORKSTATION

FIELD OF THE INVENTION

This invention relates generally to a battery assembly apparatus in a conveyor line and more particularly to an apparatus and method having a pair of workstations and a single tool operable in each workstation.

BACKGROUND OF THE INVENTION

A typical lead-acid battery for a motor vehicle has a plurality of cells of interleaved positive and negative plates received in adjacent separate wells of a case with a sealed cover which together form the housing. The positive and negative plates of adjacent cells are electrically connected together by lead straps which are welded together through a passage in a common wall of the case between the adjacent cells.

A positive lead terminal post is electrically connected to the positive strap of the first cell and a negative lead terminal post is electrically connected to the negative strap of the last cell. Each post projects through the cover and is welded to its associated strap of the same polarity and sealed to the cover.

To mass produce lead-acid batteries, it is well known to transfer a plurality of cases along a conveyor to consecutive workstations to progressively form or assemble the components of the battery. Typically, at each workstation, a tool is raised and lowered relative to the case to assemble or work on the components disposed in the case. After working on one case or workpiece, the tool must be raised so that the case can be moved on its way to the next workstation and a subsequent case may be moved into position under the tool. The tool must then be lowered to perform work on the components in this case and raised again in this continuous cycle. The time needed to raise the tool, remove the case, advance the next case into the workstation and then lower the tool to the case wastes a considerable amount of time and thereby increases the time to assemble the components to make the batteries. Providing additional tools to simultaneously work on the components in more than one case at a time greatly increases the cost of the system and still suffers from this same inefficiency in which the tools must be raised or retracted and the conveyor advanced to remove the case and advance a subsequent case to the tools. Thus, there is a need for a more efficient apparatus and system which increases the productivity of a work tool to increase the number of batteries which may be formed or assembled in a given period of time and to lower the cost to work on or assemble the workpieces.

SUMMARY OF THE INVENTION

An apparatus having at least two separate workstations to which battery cases are alternately advanced to provide at substantially all times, in at least one workstation, a battery case with components ready to be worked on by a tool carried by a shuttle which transfers the tool between the workstations. Desirably, after working on a component in a case in a first workstation, the shuttle carries the tool to a second workstation to work on a component in another case waiting in the second workstation. Simultaneously, the case in the first workstation, that was just worked on by the tool, is moved downstream away from the tool and a subsequent case is advanced into the first workstation so that it is ready to be worked on by the tool when the tool returns to the first workstation. Thus, the tool does not have to wait for a new case or workpiece to be advanced into position after performing work on a component in a case. Desirably, this dramatically increases the productivity of the apparatus or machine without substantially increasing the cost of the apparatus or machine as a whole.

In one embodiment, a plurality of machines are provided in line with one another to progressively assemble various components of lead-acid batteries. The tool of a first machine may be an intercell welder which electrically connects the various cells of a battery by welding one or more metal straps between adjoining cells. A second machine tool may comprise a heat sealer which provides and heat seals a cover onto the case of the battery. A third machine tool may comprise a terminal post welder or "post burner" which electrically connects and seals the battery terminals extending through the lid to metal bushings received on the terminals. A fourth machine tool may comprise a pressure tester which provides pressurized gas into the battery cell compartments or walls within the case and checks for any leaks within the battery. Desirably, each machine may use a single tool shuttled between the workstations at each machine so that the tool does not have to wait for a case or workpiece to be advanced as discussed above. Notably, without significantly increasing the cost of the battery assembly machine line or the floor space required for the assembly line, the number of batteries assembled for a given amount of time and tooling can be greatly increased.

Objects, features and advantages of this invention include providing a machine which has at least two workstations and a single tool shuttled between the workstations to greatly reduce the time between operations of the tool on a component of consecutive cases or workpieces, increases the productivity of the tool, can be substantially automated, may be used with a plurality of different tools to perform different operations on the components of the cases or workpieces, does not require a lot of floor space, is of relatively simple design and economical manufacture and assembly and in service has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

Detailed Description of the Preferred Embodiments

Figure 1:
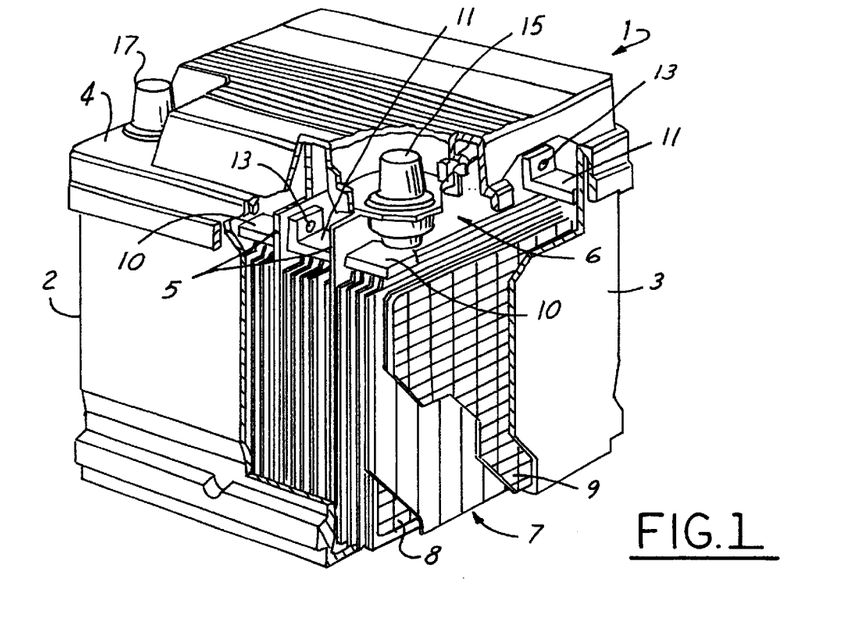
FIG. 1 is a perspective view of a lead-acid battery with portions broken away and in section.

Referring in more detail to the drawings, FIG. 1 illustrates a lead-acid battery 1 with a housing 2 having a case 3 and a top cover 4 both constructed from a plastic material such as polypropylene. The case has a plurality of integrally molded battery cell divider walls 5 defining a number of battery cell wells 6 within the housing. A battery cell 7 is disposed within each of the wells between the walls and has a set or book of interleaved positive plates 8 and negative plates 9 with a separator disposed between each plate of different polarity to prevent them from touching and thereby producing a short circuit within the cell. A positive strap 10 and a negative strap 11 electrically connect together the associated positive and negative plates of each cell across the top of the plates. To connect the individual cells together in series, an intercell connector 13 made of lead is disposed between and welded to the positive plate strap and adjoining negative plate strap of adjoining cells in series. A positive terminal post 15 of lead is connected to the positive strap of the first cell and a negative terminal post 17 of lead is connected to the negative strap of the last cell. Each post projects through the cover and is sealed to the cover and welded to its associated strap of the same polarity. In use, dilute sulfuric acid solution fills a majority of the remaining space within each well and is the electrolyte necessary to produce the chemical reactions which take place within each battery cell.

Figure 2:
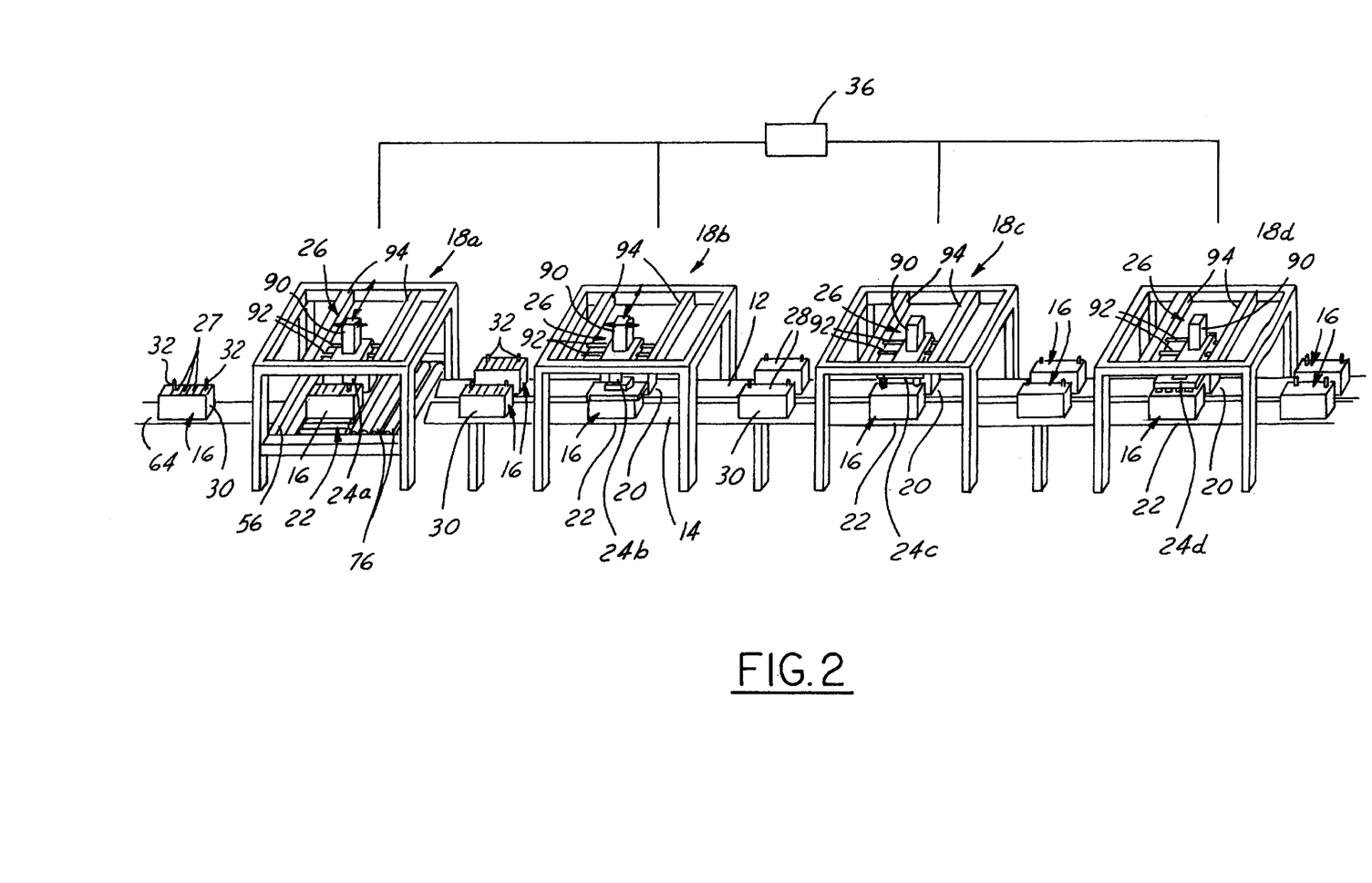
FIG. 2 is a diagrammatic perspective view of a lead-acid battery assembly line having a plurality of machines embodying the present invention.

FIG. 2 illustrates a lead-acid battery assembly line having two separately driven conveyor paths 12, 14 for assembling batteries 16 and a plurality of machines 18*a–d* each with a pair of workstations 20, 22 and a single tool 24*a–d* carried by a shuttle 26 to move between the workstations 20, 22. The tool 24*a* of the first machine 18*a* is an intercell welder which electrically connects adjacent battery cells 27 by welding together metal straps between them. The tool 24*b* of the second machine 18*b* is a heat sealer which supplies and heat seals a cover or lid 28 onto a case 30 of the battery housing. The tool 24*c* of the third machine 18*c* is a terminal welder which welds the battery terminals or posts 32 extending through the lid 28 to bushings around the posts 32. The tool 24*d* of the fourth machine 18*d* is a leak tester which injects pressurized air into the wells of the battery cells to determine if any leaks are present between the wells or out of the battery housing. Thus, as the batteries 16 are advanced along the assembly line, they are progressively assembled and thereafter checked for leaks all on the same assembly line. Other machines 18 may also be included to, for example, check the polarity of the batteries or fill the batteries with acid. The entire assembly line may be substantially automated and operated by one or more programmable controls 36.

Figure 3:
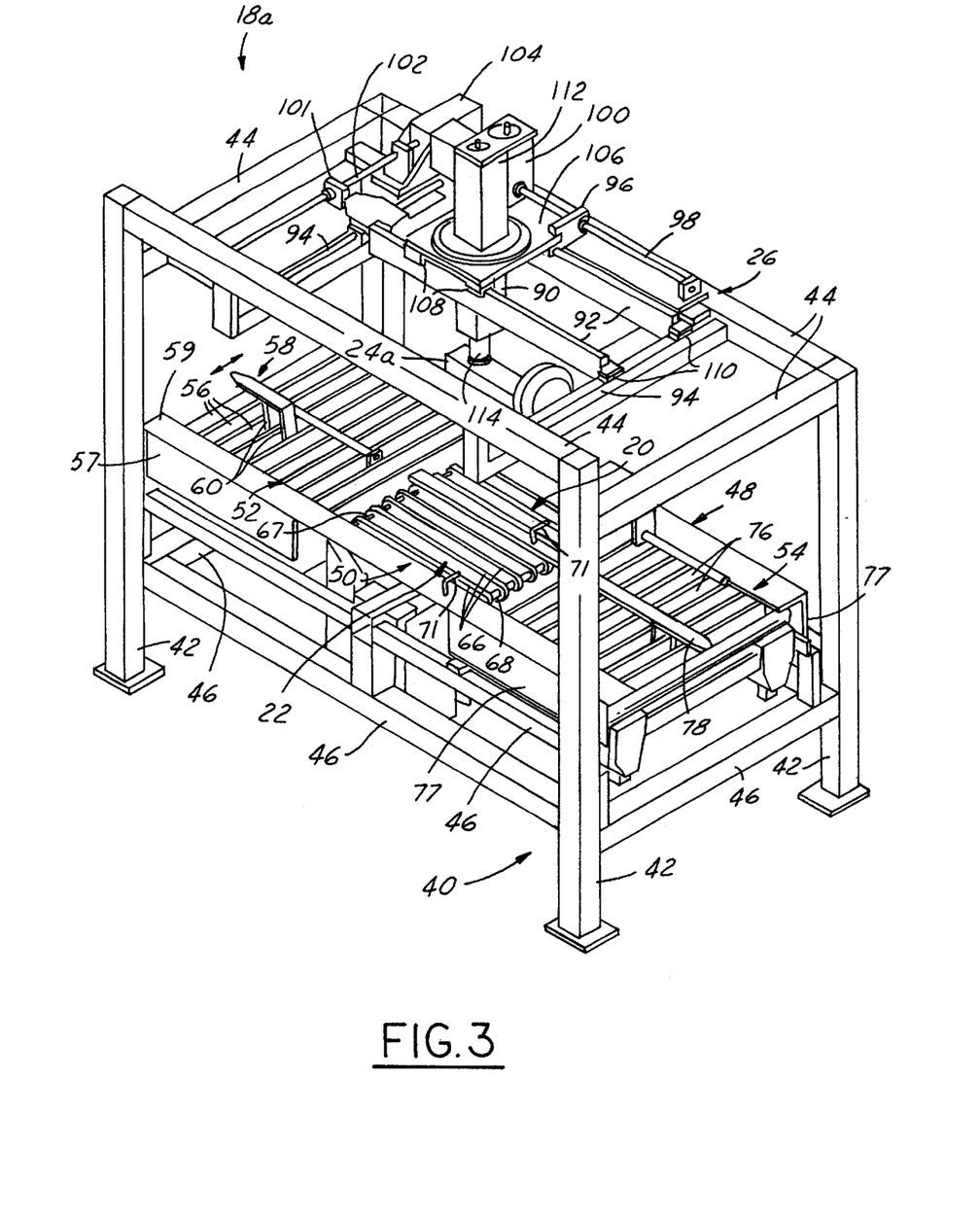
FIG. 3 is a perspective view of one of the machines shown in FIG. 2 and embodying the present invention.
Figure 4:
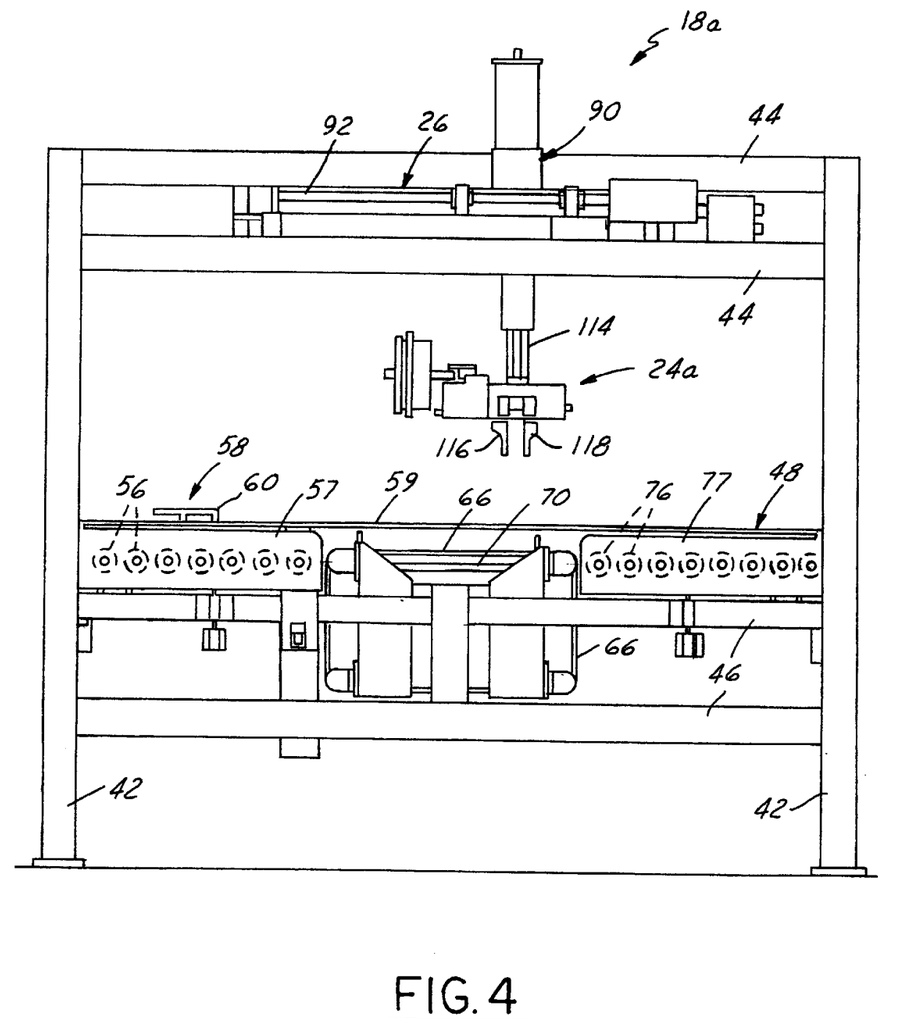
FIG. 4 is a side view of the machine of FIG. 3.
Figure 5:
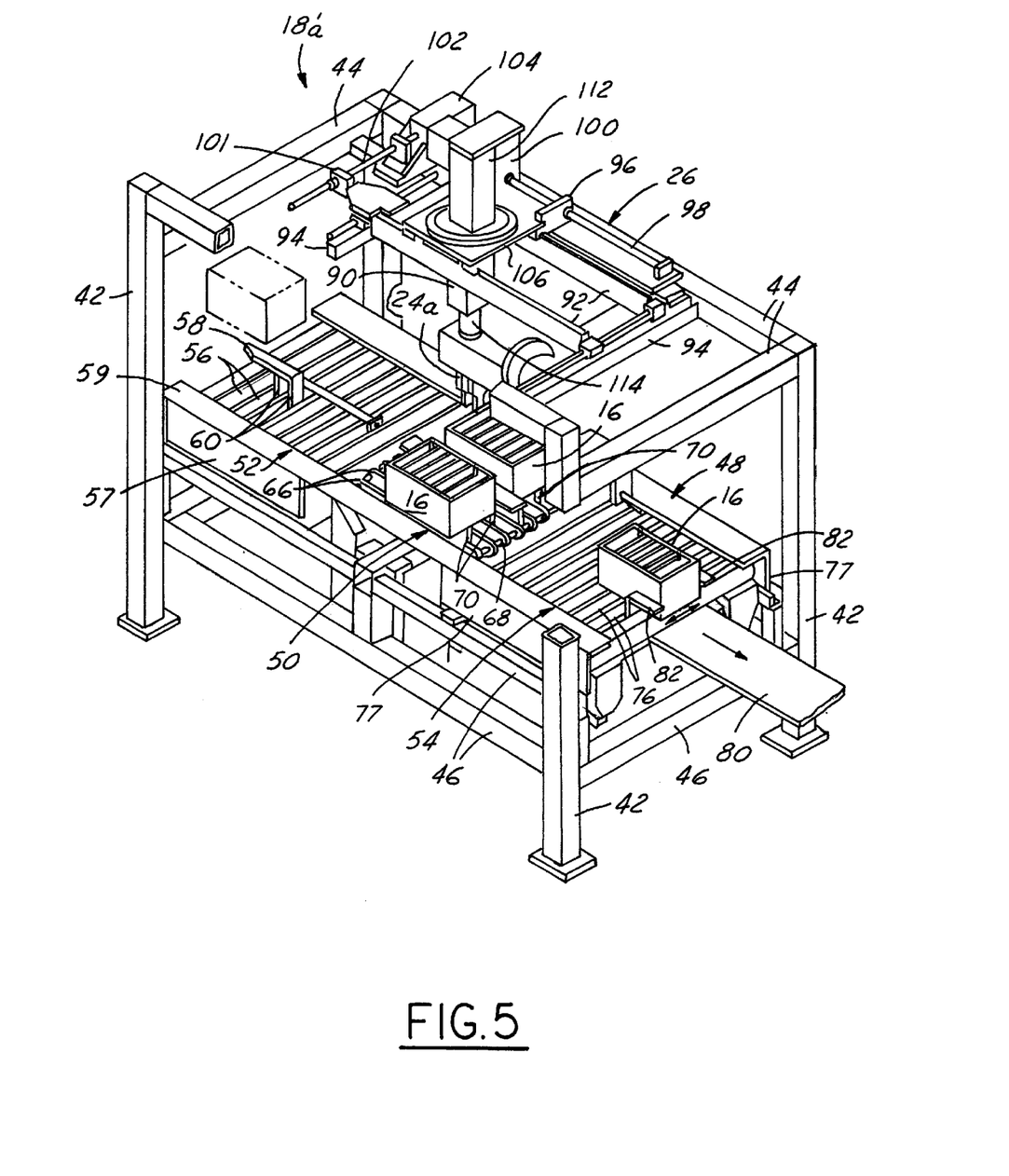
FIG. 5 is a perspective view with portions broken away illustrating a modified intercell weld machine.

FIGS. 3–5 illustrate the first machine 18*a* of the assembly line which carries the intercell weld tool 24*a* for electrically connecting cells within the battery housing by welding together adjacent lead straps. The first machine 18*a* has a frame 40 with uprights 42 interconnected by upper cross rails 44 and lower cross rails 46. A conveyor bed 48 is carried by the lower cross rails 46 and has a pair of workstations 20, 22 defined in a central portion 50, and upstream 52 and downstream 54 portions adjacent the central portion 50. The upstream portion 52 of the conveyor bed 48 has a plurality of axially spaced, elongate rollers 56 carried by side plates 57 and extending generally perpendicular to the direction of travel of batteries 16 along the conveyor bed and driven for rotation in unison by a drive mechanism (not shown). The drive mechanism may comprise an electric motor which drives a sprocket and chain which meshes with a separate sprocket connected to each roller 56 to rotate the rollers 56 in unison and advance battery cases 16 disposed thereon. A diverter 58 has supports 60 extending in between two rollers 56 and is reciprocated in a direction parallel to the rollers 56 to alternately guide batteries 16 from a single conveyor supply line 64 (FIG. 2) upstream of the first machine 18*a* to both workstations 20, 22 of the first machine 18*a*. Battery case guide rails 59 are disposed above and adjacent the end of the rollers and are laterally adjustable to accommodate cases of different widths.

The central portion 50 of the conveyor bed 48 has a plurality of axially spaced apart and parallel belts 66 extending essentially perpendicular to the rollers 56 and parallel to the direction of travel of the conveyor. The belts 66 may be received around spaced apart shafts 67, 68 each extending parallel to the rollers 56 and driven in unison with the rollers 56 to advance a battery 16 at a surface speed substantially the same as that of the rotation of the rollers. As shown in FIG. 4, to lift a battery case 16, each workstation 20, 22 disposed between the belts in each workstation. The lift rails 70 in each workstation are separately actuated to move in unison from a lowered position (FIG. 4) below the upper surface of the belts 66 to a raised position (FIG. 4) to lift a battery 16 in its workstation 20, 22 off of the belts 66 to hold and accurately position the battery 16 to be worked on by the tool 24*a–d*. Stops 71 and locators may be used to positively position the batteries 16 relative to the tool for consistency from one battery to the next. Desirably, batteries 16 may be alternately advanced by the central portion 50 of the conveyor bed 48 by raising one battery 16 off of the belts 66 and lowering the battery 16 in the other workstation onto the belts 66 so that it is advanced to the downstream portion 54 of the conveyor bed 48 by the belts 66. In this way, all of the belts 66 may be driven in unison with the batteries 16 on the different workstations 20, 22 alternately advanced.

The downstream portion 54 of the conveyor bed 48 preferably has a 20 plurality of rollers 76 carried by side plates 77 for co-rotation about an axis perpendicular to the direction of travel of batteries 16 in the assembly line. A fixed central rail 78 may be provided to guide batteries 16 from the first workstation 20 to the first conveyor 12 and batteries 16 from the second workstation 22 to the second conveyor 14. Alternatively, as shown in FIG. 5, if the batteries 16 are to be fed to a single conveyor 80 downstream of the first machine 18*a*', movable guides 82 may be reciprocated parallel to the rollers 76 to slidably move and align the batteries 16 from each workstation 20,22 to the downstream conveyor 80. Desirably, a machine 18*a–d* may be used in an assembly line having a single conveyor between machines with the use of the diverter 58, which receives batteries from a single conveyor and distributes them to each workstation 20,22, and the guides 82 which receive batteries from each workstation 20,22 and direct them to a single downstream conveyor.

The upstream and downstream portions 52, 54 of the conveyor bed 48 are preferably driven in unison so that as a battery is advanced from the central portion 50 to the downstream portion 54, a subsequent battery on the upstream portion 52 is advanced to the central portion 50. The upstream and downstream portions 52, 54 may be continuously driven with the supply conveyor 64 being selectively advanced when a battery 16 is needed in a workstation 20, 22 and with the diverter 58 operable to deliver batteries to each workstation 20,22 from the supply conveyor 64. Otherwise, sensors may be used to actuate separate controls for the upstream and downstream conveyor portions 52, 54 to selectively advance batteries 16 to and from the workstations with stops temporarily engaging batteries 16 not desired to be advanced. Alternatively, the batteries 16 may be provided to the machine 18a from two, separately controlled conveyor lines as shown in FIG. 2 for machines 18b, 18c and 18d. Each conveyor line would supply batteries to a separate workstation 20,22 and would be selectively, alternately advanced to alternately provide a new battery 16 to one and then the other of the workstations. Desirably, each of the second 18b, third 18c and fourth machines 18d are configured in this manner to provide two separate conveyor lines 12–14 of batteries 16 each worked on by a single tool 24b–d at each machine 18b–d.

The tool 24a–d at each machine 18a–d is carried by a shuttle 26 mounted by the upper cross rails 44 of the frame 40. Each shuttle 26 has a tool holder 90 slidably received on a pair of parallel and spaced apart support rails 92 which are connected at opposed ends to a pair of spaced apart and parallel guide rails 94 fixed to the frame 40 and extending essentially perpendicular to the support rails 92. A follower 96 connected to the tool holder 90 receives a ball screw 98 driven by a servo controlled electric motor 100, both carried by the support rails 92, to slidably move the tool holder 90 along the support rails 92. One or more followers 101 connected to the support rails 92 receive a ball screw 102 extending parallel to the guide rails 94 and selectively driven by another servo controlled motor 104 to slidably move the support rails 92 relative to the guide rails 94 and thereby move the tool 24a–d back and forth between the two workstations 20, 22. The tool holder 90 has a plate 106 spanning the support rails 92 with a plurality of linear slide bearings 108 disposed between the plate 106 and the support rails 92 to reduce friction between them. Similarly, the ends of the support rails 92 carry linear bearings 110 to reduce friction between the support rails 92 and the guide rails 94. Through the two servo controlled electric motors 100, 104, the work tool 24a–d can be moved along two perpendicular axes to move the tool in the direction of the conveyor movement and also perpendicular thereto between both workstations 20, 22.

To raise and lower the tool 24a–d, another servo controlled motor 112 is operably connected to an an 114 which carries the tool 24a–d. The motor 112 is controlled to reciprocate the arm and move the tool 24a–d towards and away from the conveyor bed 48 to raise and lower the tool relative to the batteries 16 in the workstations 20,22. Thus, the tool 24a–d may be moved through three orthogonal or mutually perpendicular axes to dispose the tool 24a–d at substantially any location within both workstations 20, 22 of the machine 18a–d. However, in some machines, the tool may not need to move in all three axes described above such as when the tool of a machine only performs work on one location of a battery. In this case, the support rails 92, ballscrew 98 and motor 100 can be eliminated because lateral movement or indexing of the tool within the workstations 20,22 would not be needed and the tool holder 90 can be slidably carried directly on the guide rails 94 and operably connected to ball screw 102 to move from one workstation to the other.

As shown in FIG. 4, the intercell weld tool 24a preferably has a pair of weld jaws 116, 118 slidably moved towards and away from each other to clamp and electrical resistance weld together straps disposed between adjacent cells 27 of a battery 16. The intercell weld tool 24a may be indexed to provide a plurality of welds in a single battery 16 and then moved by the shuttle 26 to provide similar welds to a battery 16 on the other workstation 20, 22. The weld jaws 116, 118 may be advanced and retracted by a pneumatic cylinder supplied with compressed air through hoses 120 communicating with an air supply through an solenoid actuated valve.

Figure 6:
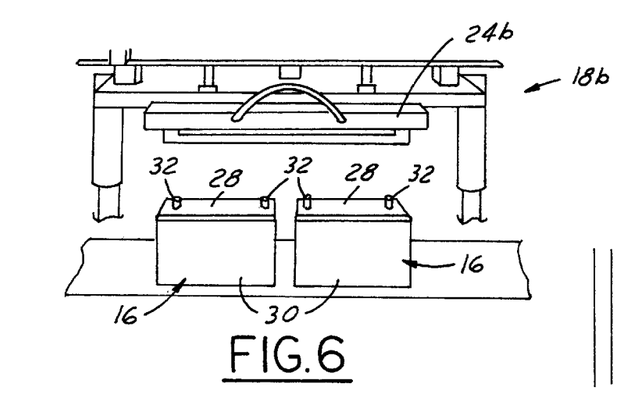
FIG. 6 is a fragmentary perspective view of a machine with a heat seal tool.

As best shown in FIG. 6, the second machine 18b has a heat seal tool 24b carried by its shuttle 26 and operable to dispose a plastic lid or cover 28 onto the plastic case 30 of each battery housing 16 and to permanently connect and seal the cover 28 to the case 30 by applying heat to weld and seal together these plastic members. The heat seal tool 24b is carried by a shuttle 26 controlled in the same manner as the shuttle 26 for the intercell weld tool 24a such that it may be advanced and retracted relative to the battery housing 16 and transferred from one workstation to the other by its shuttle 26. Lateral movement within the workstations 20,22 may not be needed with the heat seal tool 24b and thus, its shuttle 26 may not need support rails 92, motor 100 or ball screw 98. Desirably, as best shown in FIG. 2, two separate conveyor paths 12, 14 extend through the second machine 18b and are alternately advanced to alternately provide batteries 16 to the workstations 20, 22 of the second machine 18b. Alternatively, if desired, the second machine 18b may have a conveyor bed constructed as described with reference to the first machine 18a to distribute batteries from a single conveyor line to both workstations and/or to consolidate the batteries from both workstations to a single downstream conveyor line.

Figure 7:
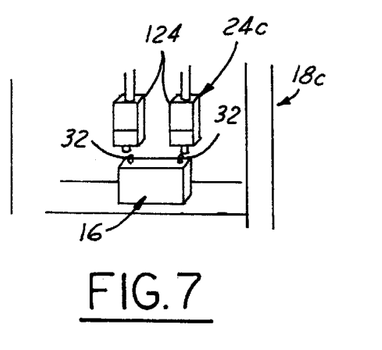
FIG. 7 is a fragmentary perspective view of a machine with a terminal welder tool.

As best shown in FIG. 7, the third machine 18c has a terminal post weld tool 24c carried by its shuttle 26. The terminal post weld tool 24c may comprise a pair of heads 124 each adapted to simultaneously weld a separate one of both terminal posts 32 extending through the cover 28 of a single battery housing to their surrounding bushings to electrically connect the terminals 32 and to provide a seal around them with the cover. Alternatively, the terminal weld tool 24c may comprise a single head indexed to weld the terminal posts 32 of the batteries 16 one after the other. In either arrangement, the terminal weld tool 24c may be advanced and retracted toward and away from the batteries 16 and also transferred from one workstation 20, 22 to the other by its shuttle 26. Also, the third machine 18c may be used with two separate conveyor lines (as shown in FIG. 2) or may be configured to operate with a single conveyor upstream and/or downstream of the third machine 18c as described above with reference to the other machines.

Figure 8:
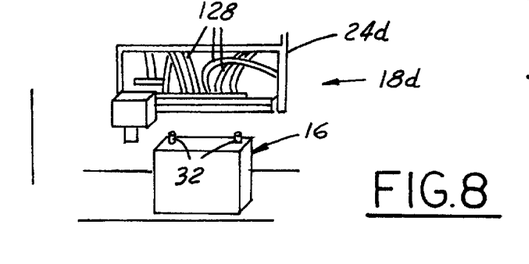
FIG. 8 is a fragmentary perspective view of a machine with a leak test tool.

As best shown in FIG. 8, the fourth machine 18d may provide a leak test tool 24d. The leak test tool 24d has a plurality of outlets or nozzles each in communication with a compressed gas supply through a plurality of hoses 128. The nozzles inject the compressed gas into the wells of the various cells 27 of the battery housing 16 through openings in the cover 28 to determine if there are any leaks between the wells of the cells 27 of the battery 16 or otherwise in the battery housing. The leak test tool 24d may be advanced and retracted relative to the batteries 16 and transferred from one workstation 20, 22 to the other by its shuttle 26. The fourth machine 18d may also be used with two separate conveyors or may be configured to operate with a single conveyor upstream and/or downstream thereof as described with reference to the other machines.

Other tools may be carried by shuttles of still further machines as desired for the assembly and testing of the battery such as for polarity tests and acid filling stations for example. Desirably, the entire assembly line may be operated by one or more preprogrammed controls 36 so that the assembly line is extremely flexible and may be readily automated and adapted to accommodate production runs of a wide variety of different battery styles and types.

Operation

After books of lead acid battery plates are assembled into a case 30 of the housing to provide a plurality of cells 27 in separate wells between the books of grids, the cells 27 must be electrically connected, a lid 28 must be provided on the base 30 and the terminals 32 of the battery 16 must be welded and sealed. Each of these operations, among others, may be performed at consecutive machines 18a–d along a conveyor assembly line which can be substantially automated by one or more computer controls and various servo-controlled drive mechanisms. To increase the productivity of the work tool 24a–d at each machine 18a–d, each machine 18a–d has at least a pair of workstations 20, 22 and the work tools 24a–d are carried by shuttles 26 which move the tools 24a–d between the workstations 20, 22.

Desirably, after working on a battery 16 in a first workstation 20, the tool 24a–d may be moved by the shuttle 26 to work on a battery 16 waiting in a second workstation 22. Simultaneously, the battery 16 in the first workstation 20 which has already been worked on, is advanced downstream of the first workstation 20 and a new battery 16 is advanced into the first workstation 20 so that it may be worked on by the tool 24a–d after the tool 24a–d completes its work on the battery 16 in the second workstation 22. After completing work on the battery 16 in the second workstation 22, the tool 24a–d is moved back to the first workstation 20 and the battery 16 in the second workstation 22 is advanced out of the second workstation 22 and a new battery 16 is moved into the second workstation 22. In this manner, the batteries 16 on the workstations 20, 22 of the machine 18a–d are alternately advanced so that a new battery 16 is ready and waiting for the tool 24a–d in one workstation 20, 22 at all times. Desirably, because the tool 24a–d does not have to wait for a battery 16 already worked on to be removed and a subsequent battery 16 to replace it, the tool 24a–d may be rapidly shuttled between the workstations 20, 22 to alternately work on batteries 16 in the workstations 20, 22. This greatly increases the productivity and efficiency of the machine 18a–d and tool 24a–d and increases the number of batteries 16 which may be assembled in a given period of time. Notably, these gains are achieved without a significant increase in tool and machine costs or in floor space consumed by the assembly line.

What is claimed is:

1. A battery assembly machine having at least two workstations comprising:

a frame;

a first workstation and a second workstation carried by the frame, the workstations being in side-by-side relationship, immediately adjacent to, and in line with each other in a direction transverse to the direction of movement of battery cases through the workstations;

a shuttle carried by the frame for movement alternately between the first and second workstations along a path generally transverse to the direction of movement of the battery cases through the workstations, a first actuator operably connected to the shuttle to move the shuttle alternately between the first and second workstations in a direction generally transverse to the direction of movement of workpieces through the workstations;

a tool carried by the shuttle for movement by the shuttle alternately between the first and second workstations and driven by a second actuator for movement towards and away from battery cases in the workstations;

a single supply conveyor upstream of the workstations and configured to advance a single row of a plurality of battery cases toward the workstations;

a diverter upstream of the workstaions and configured to guide battery cases from the single conveyor alternately to the first workstation when the shuttle is in the second workstation and to the second workstation when the shuttle is in the first workstation; and an automated control system configured to operate the single conveyor, diverter and first and second actuators so that after the tool performs work on a workpiece carried by a battery case in one workstation, the shuttle and tool are moved by their actuators to perform work on another workpiece carried by a battery case in the other workstation and generally simultaneously therewith the battery case in said one workstation is advanced out of said one workstation and a new battery case from the supply conveyor is advanced into said one workstation to bring a new workpiece into said one workstation while the another workpiece in the other workstation is being worked on by the tool to ensure that a workpiece is available to be worked on by the tool in at least one of the workstations at all times to increase the number of workpieces the tool can work on in a given amount of time.

2. The battery assembly machine of claim 1 which also comprises a single conveyor downstream of the workstations configured to advance a single row of battery cases and a guide movable relative to the downstream conveyor to guide battery cases from the workstations to the single downstream conveyor in a single row.

3. The battery assembly machine of claim 2 wherein the guide is movable generally perpendicular to the direction of travel of the battery cases to guide battery cases from each workstation to the downstream single conveyor.

4. The battery assembly machine of claim 1 which also comprises a first downstream conveyor configured to advance battery cases received from the first workstation and a second downstream conveyor configured to advance battery cases received from the second workstation.

5. The battery assembly machine of claim 1 which also comprises a pair of lifters, each carried by the frame, located in a separate workstation and movable relative to the conveyor from a lowered position below the conveyor to a raised position to lift a battery case from the conveyor and retain the battery case in the workstation associated with the lifter.

6. The battery assembly machine of claim 1 wherein the shuttle comprises at least one guide rail carried by the frame, at least one support rail slidably carried by and extending generally perpendicular to the guide rail and a tool holder slidably carried by at least one support rail to permit movement of the tool holder in a first direction along the support rail and in a second direction perpendicular to the first direction along the guide rail and with the support rail.

7. The battery assembly machine of claim 6 which also comprises a third actuator operably connected to the tool holder to drive the tool holder for movement relative to and along the support rail and the first actuator is operably connected to at least one support rail to drive the support rail and tool holder for movement along the guide rail.

8. The battery assembly machine of claim 7 wherein two parallel support rails and two parallel guide rails are provided with the tool holder carried by each support rail and each support rail extending between and carried by each guide rail.

9. The battery assembly machine of claim 1 wherein the tool is a welding gun adapted to provide at least one weld to a workpiece carried by each battery case.

10. The battery assembly machine of claim 10 wherein the tool is a heat seal tool.

11. A battery assembly machine having at least two workstations comprising:

a frame;

a first workstation and a second workstation carried by the frame, the workstations being in side-by-side relationship, immediately adjacent to, and in line with each other in a direction transverse to the direction of movement of battery cases through the workstations;

a shuttle carried by the frame for movement alternately between the first and second workstations along a path generally transverse to the direction of movement of the battery cases through the workstations, a first actuator operably connected to the shuttle to move the shuttle alternately between the first and second workstations in a direction generally transverse to the direction of movement of workpieces through the workstations;

a tool carried by the shuttle for movement by the shuttle alternately between the first and second workstations and driven by a second actuator for movement towards and away from battery cases in the workstations;

a first conveyor configured to advance a single row of a plurality of battery cases through the first workstation;

a first lift in the first workstation movable by a lift actuator relative to the first conveyor from a lowered position below the first conveyor to a raised position to lift a battery case from the first conveyor and to retain the lifted battery case in the first workstation;

a second conveyor configured to advance a single row of a plurality of battery cases through the second workstation;

a second lift in the second workstation and movable by a lift actuator relative to the second conveyor from a lowered position below the second conveyor to a raised position to lift a battery case from the second conveyor and to retain the lifted battery case in the second workstation; and an automated control system configured to operate the first actuator to alternately move the shuttle between the first and second workstations, and to operate at least one lift actuator so that alternately in the one of the first and second workstations without the shuttle therein, its lift is moved to the lowered position so that the battery case thereon is removed by the conveyor in such one workstation and a new battery case is advanced by such conveyor into such one workstation and the at least one lift actuator moves such lift to its raised position to lift the new battery case from such conveyor and retain the battery case in such one workstation to ensure that a workpiece carried by a battery case is available to be worked on by the tool in at least one of the workstations at all times to increase the number of workpieces the tool can work on in a given amount of time.

12. The battery assembly machine of claim 11 wherein the shuttle comprises at least one guide rail carried by the frame, at least one support rail slidably carried by and extending generally perpendicular to the guide rail and a tool holder sidably carried by at least one support rail to permit movement of the tool holder in a first direction along the support rail and in a second direction perpendicular to the first direction along the guide rail and with the support rail.

13. The battery assembly machine of claim 11 wherein the tool is a welding gun adapted to provide at least one weld to a workpiece carried by each battery case.

14. The battery assembly machine of claim 11 wherein the tool is a heat seal tool.

\* \* \* \* \*

UNITED STATES PATENT AND TRADEMARK OFFICE
CERTIFICATE OF CORRECTION

PATENT NO. : 6,279,224 B1
DATED : August 28, 2001
INVENTOR(S) : John O. Wirtz et al.

It is certified that error appears in the above-identified patent and that said Letters Patent is hereby corrected as shown below:

Column 8,
Line 64, change "claim 10" to -- claim 1 --.

Column 10,
Line 24, change "sidably" to -- slidably --.

Signed and Sealed this

Fourteenth Day of May, 2002

*Attest:*

JAMES E. ROGAN
*Attesting Officer*     *Director of the United States Patent and Trademark Office*